E. E. HAWKINS.
HANDLE FOR SAWS.
APPLICATION FILED SEPT. 14, 1909.
966,543.
Patented Aug. 9, 1910.
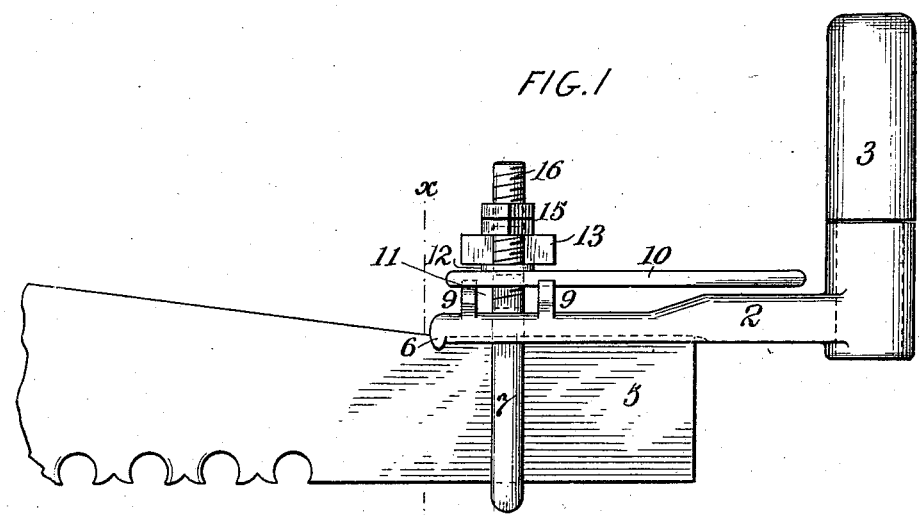
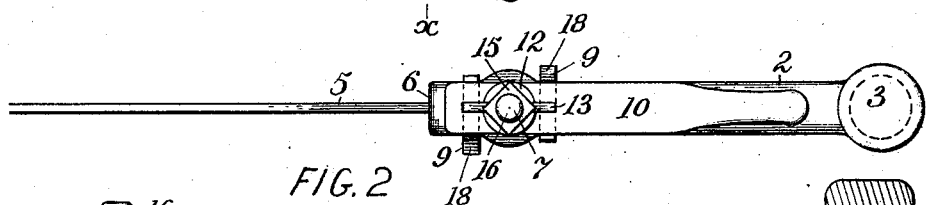
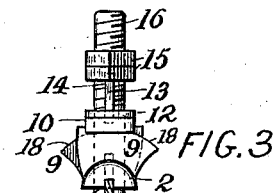
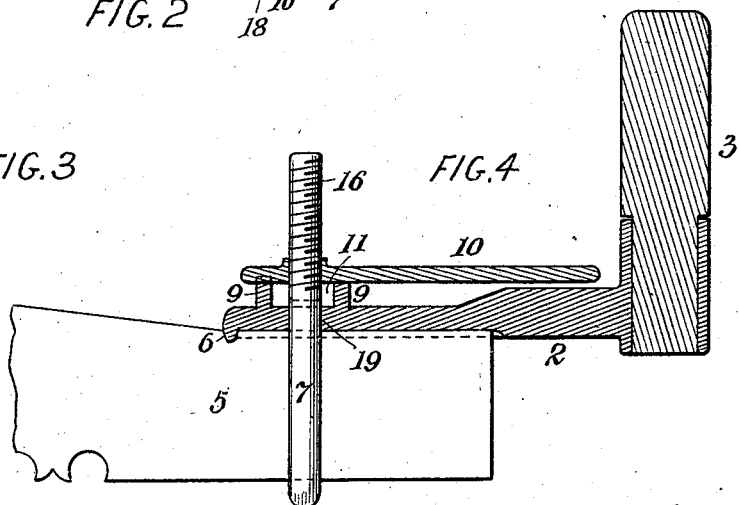
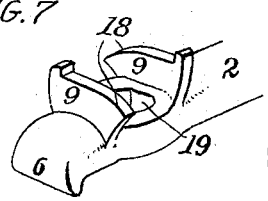
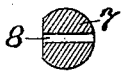
WITNESSES
INVENTOR
Elbert E. Hawkins
BY
ATTORNEY

UNITED STATES PATENT OFFICE.

ELBERT E. HAWKINS, OF SIDNEY, NEW YORK.

HANDLE FOR SAWS.

966,543.　　　　Specification of Letters Patent.　　Patented Aug. 9, 1910.

Application filed September 14, 1909. Serial No. 517,548.

*To all whom it may concern:*

Be it known that I, ELBERT E. HAWKINS, a citizen of the United States, and a resident of the city of Sidney, county of Delaware, and State of New York, have invented an Improvement in Handles for Saw and other Blades, of which the following is a specification.

My invention has reference to handles for saw and other blades and consists of certain improvements which are fully set forth in the following specification and shown in the accompanying drawings which form a part thereof.

The object of my invention is to provide a detachable handle for saw blades which will enable the speedy detachment of the handle when necessary as frequently occurs in the use of cross-cut saws when used in felling trees and at times when it is required to quickly withdraw the saw blade lengthwise from the tree.

My improved handle may be employed in connection with other tool blades or other purposes where found adapted and in which an operating part is required to be speedily detached.

My invention consists of certain features of construction which are fully described hereinafter and more specifically defined in the claims; and said improvements will be better understood by reference to the drawings, in which:

Figure 1 is a side elevation of one end of a saw with my improved handle applied thereto; Fig. 2 is a plan view of the same; Fig. 3 is a cross section of the same on line *x—x* of Fig. 1; Fig. 4 is a sectional elevation of a modification of my invention; Fig. 5 is a cross section of the clamping bolt; Fig. 6 is a cross section of a modified form of clamping bolt; and Fig. 7 is a perspective view of a portion of the handle bar.

2 is the handle bar and has a wooden handle 3. This handle bar has, upon its under side, a groove 4, into which the upper edge of the saw blade 5 rests; and has further, at its end, a transverse tooth 6 which fits down into a notch in the saw blade to prevent the latter shifting in a longitudinal direction. The handle bar 2 is additionally provided with two upwardly extending lugs 9 preferably respectively cam shaped at their opposite edges as shown at 18 in Fig. 7 and forming a space 11 between them and into which a hole 19 in the handle bar opens and through which the bolt 7 passes. The clamping bolt 7 is slotted at 8 to receive the saw blade 5 and hold it in position to the handle bar. This bolt 7 extends upward through the hole 18 in the handle bar and supports at its upper end a releasing lever 10, a washer 12, a key 13 and nuts 15. The releasing lever 10 is a bar having a hole by which it is hinged to the bolt 7 and it is further so shaped as to rest upon the upper edges of the lugs 9 when turned to a position parallel to the handle bar, as shown in Fig. 1. The washer 12 rests upon the releasing lever 10. The key 13 extends through a slot in the bolt 7 and the free ends rest upon the washer 12. This slot may, if desired, be an extension of the slot 8. The upper end of the bolt 7 is screw-threaded as at 16 and the nuts 15 are screwed down upon the key 13. When the parts are as indicated in Figs. 1, 2 and 3, the saw blade 5 will be clamped tightly upon the handle bar 2.

If the handle bar is to be quickly disconnected from the saw blade, it is only necessary to throw the lever 10 around at right angles to the length of the handle bar, said operation causing it to slip from the lugs 9 and drop down into the space 11 between them. This action permits the bolt 7 to drop and with it the saw blade, to such an extent as to release the blade from the tooth 6 of the handle bar. The handle bar may then be withdrawn from the saw blade. If the blade is horizontal, the handle bar may be shifted upon the bolt when released by the releasing lever 10 and then be withdrawn with the bolt from the saw blade.

The use of the key 13 prevents the nuts 15 from being turned when shifting the releasing lever, but this key may be omitted if desired. It will also be evident that if the key 13 is made so that it may be easily withdrawn, the lugs 9 may be made very low and the releasing of the saw blade be secured by withdrawing the key after the tension has been relieved by throwing the lever 10 around to the right angle position before explained. The total amount of play required to release the saw blade is an amount equal to the depth of the tooth 6 plus the depth of the groove 4, and it is the object of my invention to secure this amount of play between the handle blade and saw blade quickly and without the necessity of disturbing the nuts 15 upon the bolt 7. It will be understood that by using two nuts they will be locked in definite position and the handle bar may be repeatedly locked upon and removed from the saw blade without disturbing the operative adjustment of the parts.

While the saw blade will prevent the bolt 7 from rotating when shifting the releasing lever 10, it is preferable to form the bolt with a flattened portion 17 (Fig. 5) fitting a corresponding flattened portion in the hole 19 of the handle bar 2, or, if desired, the bolt may be eliptical in cross section at its portion (Fig. 6) where it passes through the hole 19 in the handle bar and which hole would be made to correspond.

As before stated, my invention is especially designed for handles for saw blades, but may be employed for other uses, if desired. It will be observed that the device embodies in its operation, two clamping actions, namely, one performed by the nuts 15 to insure the degree of clamping power, and the other by the lever 10 and cam lugs 9 by which the predetermined clamping power may be quickly applied and removed as often as desired without changing the degree of the clamping power; and while I have shown suitable means for accomplishing these results, my invention may be embodied in the modified forms of said means without departing from the spirit of the invention.

Having now described my invention what I claim as new and desire to secure by Letters Patent, is:

1. A detachable handle comprising a handle bar adapted to fit the tool to which it is to be clamped and having a hole and two raised points of support, combined with a clamping bolt extending through the hole in the handle bar, and means for putting the bolt under clamping tension composed of a part secured to the bolt and a shiftable abutment between the handle bar and the part secured to the bolt consisting of a long lever pivoted axially upon the bolt and supported upon the two raised points of support of the handle bar at opposite sides of the bolt and of a width and rotatable to a position to drop down between the said points of support to give a quick maximum releasing movement to the bolt.

2. A detachable handle comprising a handle bar adapted to fit the tool to which it is to be clamped and having a hole and two lugs of the same height respectively on opposite sides of said hole, combined with a clamping bolt to clamp the tool extending through the handle bar, a long releasing lever rotatably mounted upon the bolt and normally resting upon the lugs of the handle bar and of a width adjacent to the bolt less than the distance between the lugs, and means on the bolt pressing upon the releasing lever to hold the bolt in clamping position.

3. A detachable handle comprising a handle bar adapted to fit the tool to which it is to be clamped and having a hole and two oppositely arranged lugs of similar height respectively on opposite sides of said hole, combined with a clamping bolt to clamp the tool extending through the handle bar, a long releasing lever rotatably mounted upon the bolt and normally resting upon the lugs of the handle bar and of a width less than the distance between the lugs, and means on the bolt pressing upon the releasing lever to hold the bolt in clamping position, said means comprising a nut adjustably screwed upon the bolt.

4. A detachable handle comprising a handle bar adapted to fit the tool to which it is to be clamped and having a hole and two lugs respectively on opposite sides of said hole, combined with a clamping bolt to clamp the tool extending through the handle bar, a releasing lever rotatably mounted upon the bolt and normally resting upon the lugs of the handle bar, and means on the bolt pressing upon the releasing lever to hold the bolt in clamping position said means comprising a nut adjustably screwed upon the bolt and a key interposed between the nut and lever.

5. A detachable handle comprising a handle bar adapted to fit the tool to which it is to be clamped and having a hole and two lugs respectively on opposite sides of said hole, combined with a slotted clamping bolt to clamp the tool extending through the handle bar, a releasing lever rotatably mounted upon the bolt and normally resting upon the lugs of the handle bar, and means on the bolt pressing upon the releasing lever to hold the bolt in clamping position said means comprising a key extending through the slot in the bolt, a washer between the key and lever, and a nut on the bolt on the other side of the key.

6. A detachable handle composed of a handle bar adapted to fit the tool to which it is to be clamped, combined with a clamping bolt extending through the handle bar, means adjustable on the bolt to regulate the extent of clamping action, means independent of the bolt and handle bar interposed between the handle bar and the adjustable means on the bolt for quickly releasing the bolt from the clamping action of the adjustable means and devices carried by the bolt to prevent the means independent of the bolt and handle bar from turning the adjustable means on the bolt.

7. A detachable handle composed of a handle bar adapted to fit the tool to which it is to be clamped, combined with a clamping bolt extending through the handle bar and screw-threaded on its end, means adjustable on the bolt to regulate the extent of clamping action and providing a non-rotatable shoulder, part, a nut screwed upon and adjustable lengthwise of the bolt and pressing upon the shoulder, and devices independent of the bolt and handle bar interposed between the handle bar and the nonrotatable shoulder part for quickly releasing the bolt from the clamping action of the adjustable nut.

In testimony of which invention, I hereunto set my hand.

ELBERT E. HAWKINS.

Witnesses:
 HARRY B. HINDS,
 FRANK D. HOWLAND.